Jan. 11, 1955

G. MEYER 2,699,402

METHOD FOR THE MANUFACTURE OF PLASTIC ARTICLES
HAVING REFLECTING SURFACES THEREON

Filed July 28, 1953

Garson Meyer
INVENTOR.

BY

ATTORNEYS

Jan. 11, 1955
G. MEYER
2,699,402
METHOD FOR THE MANUFACTURE OF PLASTIC ARTICLES
HAVING REFLECTING SURFACES THEREON
Filed July 28, 1953
2 Sheets-Sheet 2
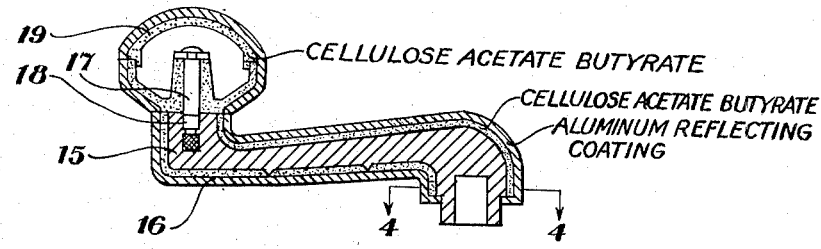
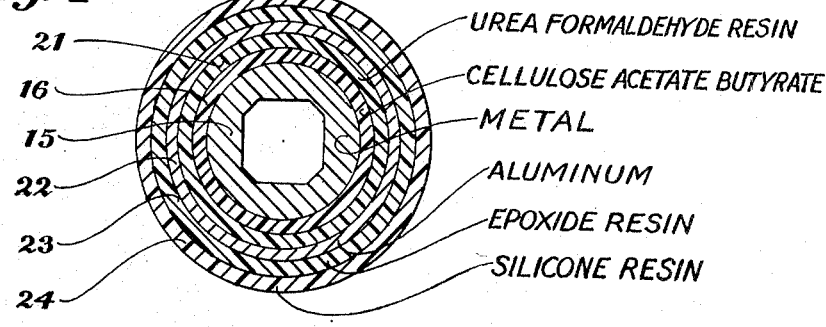
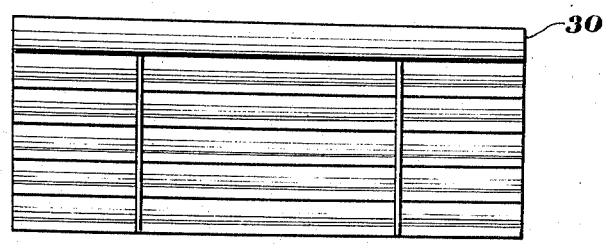
*Garson Meyer*
INVENTOR.
BY
ATTORNEYS United States Patent Office 2,699,402
Patented Jan. 11, 1955

2,699,402

METHOD FOR THE MANUFACTURE OF PLASTIC ARTICLES HAVING REFLECTING SURFACES THEREON

Garson Meyer, Rochester, N. Y., assignor to Eastman Kodak Company, Rochester, N. Y., a corporation of New Jersey Application July 28, 1953, Serial No. 370,821

4 Claims. (Cl. 117—35)

This invention relates to plastic articles having tenaciously adhering metal surfaces thereon, and more particularly to a novel lamellar structure, and its method of manufacture comprising a plastic base or body of a desired shape and size having a reflecting metallized coating or a decorative metal coating thereon which are attached to the plastic body through intervening material, and which metallized coating may be overcoated with one or more substantially transparent protective coatings.

The present invention further relates to such articles, and their methods of manufacture, which have as the body or base of the articles, a thermoplastic composition containing cellulose acetate butyrate. The metal employed to form the decorative or reflecting surface is preferably aluminum and is coated by a vacuum coating method in which the article to be coated is exposed in a vacuum to vaporized aluminum.

This application is a continuation-in-part of my copending application Serial No. 346,846, filed April 6, 1953, and entitled "Photoflash Reflector and Method of Manufacture."

Heretofore, plastics of various kinds have been metal coated by different processes often with indifferent success. However, cellulose acetate butyrate, which has excellent physical and chemical properties and which is attractive from the economic standpoint, has not previous to my invention been successfully coated by a vacuum coating process. I have discovered this appears due in part to difficulty in controlling inherent gas formation by the plastic body being vacuum coated and to poor adherence due to plasticizer exudation.

An object, therefore, of the present invention is a plastic article of the class discovered having a tenaciously adhering metal coating thereon.

Another object of this invention is an improved metallized plastic reflector.

Still another object of the invention is a method for making a metallized plastic article which has a decorative finish.

Yet another object is an improved method for making a metallized cellulose acetate butyrate base reflector suitable for use with photoflash lamps.

The invention will be further understood by reference to the following detailed description and related drawings in which:

Fig. 3 is a sectional view in elevation of a handle suitable to raise and lower automobile windows and the like having a cellulose acetate butyrate plastic sheath over a metal core, the plastic sheath being metallized in accordance with the present invention;

Fig. 4 is a cross sectional view taken on lines 4—4 of Fig. 3; and

Fig. 5 is a front elevation of a radio grill made of a cellulose acetate butyrate plastic and metallized in accordance with the present invention.

Figure 1:
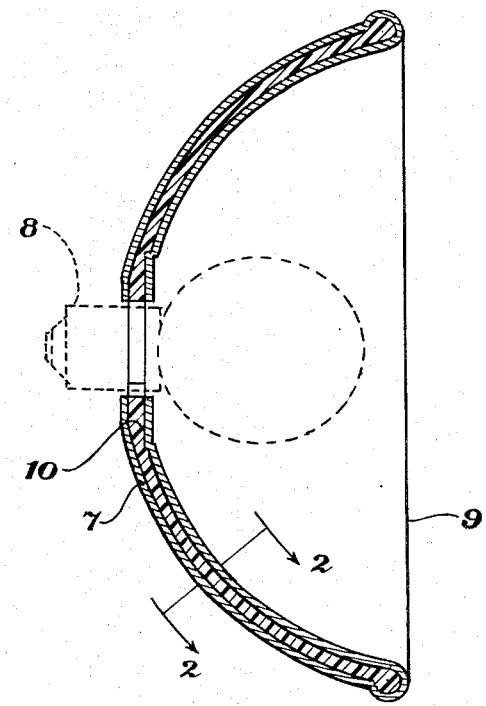
Fig. 1 is a sectional view of a reflector made in accordance with my invention.

Referring to Fig. 1 there is shown in section a photoflash reflector 9 having a body portion 10 preferably made of a plastic such as the material known as Tenite II thermoplastic which comprises a plasticized cellulose acetate butyrate composition. The body portion 10 may be molded in a suitable shaped mold by the well known injection molding process in which the plastic is heated to thermoplasticity and forced by a piston through a nozzle into the mold cavity which in the present instance is of a contour corresponding to the shape of the desired reflector body 10. The Tenite II plastic employed is preferably that available on the market as 201-A-2951-MH, CLR. This plastic will injection mold at a molding cylinder temperature of approximately 440° F. and the mold temperature may be held at 160° F.±5° F. during the molding operation. An injection pressure of 1600 p. s. i. may be advantageously employed. The mold may be a single cavity mold or even a four cavity mold. For the single cavity mold a four ounce injection molding machine may be employed. A twenty ounce injection molding machine is satisfactory to use in connection with the four cavity mold.

Figure 2:
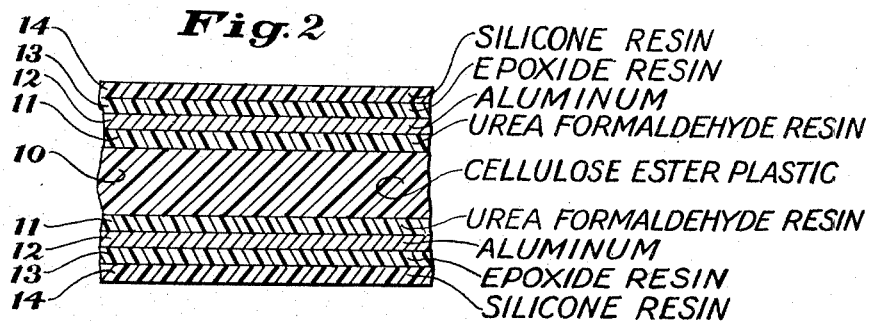
Fig. 2 is a magnified cross-sectional view of the structure of the reflector taken on the lines 2—2 of Fig. 1 showing more clearly the relative position of the various coatings on the plastic base.

The layers shown generally as 7 in Fig. 1 and more in detail in Fig. 2 are then placed on the body 10 in the following manner.

The molded plastic body 10 is then diped into a solution of a urea-formaldehyde resin and a thin layer 11 of this resin is thus placed over the entire surface of the plastic body 10. The resin coating 11 is then caused to adhere to the plastic body 10 by heating as in an oven for ½ to 2 hours at 160–180° F.

The plastic body 10 having the adherent urea-formaldehyde resin layer 11 covering the entire surface of the plastic body 10 is now in condition to be metallized. It is preferred that the metallizing operation be conducted in a vacuum in which the metal is vaporized and caused to coat completely the surface of the reflector with a metal coating 12. Aluminum is preferably employed as the coating metal and the aluminum available on the market as "Alcoa 2-S" may be advantageously employed. When the metallizing is completed the vacuum coating apparatus is brought back to atmospheric pressure and the metallized reflector is removed from the apparatus.

To preserve the bright mirror-like metal surface from being marred by subsequent handling and usage an epoxide-urea resin is dipped coated thereover. This coating is shown in Fig. 2 at 13. This transparent coating is baked at 160–180° F. for ½–2 hours to cause it to adhere to the aluminum metal surface.

A further transparent layer is preferably coated over the epoxide-urea layer 13 which increases the resistance of the surface to scratching. It is preferred that a thin silicone resin layer 14 be placed over the epoxide layer 13. This silicone layer may be coated from a solution and air dried at room temperatures, i. e. approximately 20° C.

The reflector can now be assembled with a fixture having a flash bulb socket and means for attaching to a camera body. Such assembly units form no part of the instant invention. For purpose of illustration, however, a flash bulb 8 is shown positioned in the reflector 9 in Fig. 1.

Referring to Fig. 3 there is shown a handle of the type employed to open and close windows in automobiles having a metal core 15 covered with a coating 16 of the cellulose acetate butyrate plastic. A stud member 17 is mounted in a fixed position in the handle at 18. The knob structure 19, which is mounted to turn on the stud member 17, may be also of cellulose acetate butyrate plastic and as shown has a hollow center. The knob can be made by any satisfactory method of molding, such as by injection molding, as well understood in the art.

The metal core 15 of the handle may be conveniently coated with cellulose acetate butyrate plastic in accordance with the injection molding procedure described in British Patent 507,610 accepted June 19, 1939.

The several resin and the aluminum coatings which are placed over the respective cellulose acetate butyrate surfaces are shown more clearly in Fig. 4 which represents a cross-section of the handle, it being understood that in the case of the knob structure, it has no metal core in its center, and the coatings are of course supported by the cellulose acetate butyrate from which the knob is molded.

The cellulose acetate butyrate knob and the cellulose acetate butyrate coated handle before assembly are then individually dipped in a solution of a urea-formaldehyde resin containing a suitable polymerizing catalyst and a thin layer 21 is thus coated over the respective surfaces of the cellulose acetate butyrate plastic of the knob and handle.

The resin coating 21 is then caused to adhere to the acetate-butyrate surface by heating as in an oven for ½ to 2 hours at 160–180° F. The knob and the handle are now in condition to be separately metallized with aluminum by the vacuum coating process mentioned above and described in more detail hereinafter.

The knob and handle will now have a bright mirror-like aluminum surface 22 thereon and in accordance with the invention to prevent this surface from being marred by subsequent handling and usage a transparent epoxide-urea resin is dipped coated thereover. This coating is shown in Fig. 4 at 23. The thin silicone resin layer 24 is preferably placed over the epoxide layer 23. The silicone layer may be coated from a solution and air dried at room temperatures, for example 20° C. The knob and handle can now be assembled and mounted onto the hub of a window raising mechanism in an automobile body.

Referring to Fig. 5 there is shown a radio grill 30

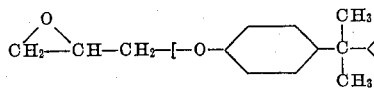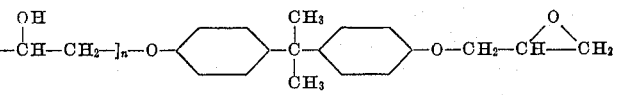

which has been injection molded from cellulose acetate butyrate plastic. This is first dip coated with the urea-formaldehyde resin as described above, and baked at 160–180° F. for ½ to 2 hours. The aluminum is then vacuum coated over the entire surface of the urea-formaldehyde layer on the molded grill. As described herein the mirror-like aluminum finish is overcoated with the epoxide-urea resin which is baked thereon and then finally coated with the silicone resin which is air dried. This procedure results in an attractive radio grill having a highly reflecting surface thereon. Except for the difference in configuration the coatings on this radio grill are similar to those shown in Fig. 2.

Urea-formaldehyde solution

The urea-formaldehyde solution from which the initial layer is formed on the plastic body may preferably have the following composition by weight:

| | Per cent |
|---|---|
| Urea-formaldehyde resin | 22.3 |
| Butyl alcohol | 2.3 |
| Denatured alcohol | 49.2 |
| Naphtha (low flash) | 26.0 |
| Catalyst (phosphoric acid) | 0.2 |

This sealing or barrier coating will adhere excellently to the cellulose acetate butyrate reflector body and effectively prevent out gassing of volatiles from this plastic body during the vacuum coating of the reflecting metal thereon. Furthermore this sealing layer does not in itself generate sufficient gases to interfere with the evacuation of the coating chamber. Accordingly a rapid pump down cycle may be employed for the vacuum metallizing operation. This novel sealing composition also will cover minor mold scratches and provide a good high gloss surface for metallizing. It contains no solvents which adversely affect the cellulose acetate butyrate plastic body of article being coated and can be baked thereover at temperatures at which the plastic body will retain the desired curvature. It does not check or craze or substantially attack the plastic body. While the above coating composition is preferred, satisfactory results can be obtained if the percentage of the components in the solution are varied within 1 to 2% of the specified formula.

Metal coating

Various apparatus in which metals can be vaporized and coated onto an article in vacuum may be employed for this step in my process for making photoflash reflectors. The vacuum coating apparatus manufactured by Distillation Product Industries is quite suitable for production use. This unit includes a cylindrical vacuum chamber, large enough to coat approximately 200 plastic reflectors of a size comparable to that shown in Fig. 1. The plastic units are supported on a plurality of rods running lengthwise of the chamber and during the coating operation are rotated around the horizontal axis of the vacuum chamber. In this way all portions of the surface of each reflector is exposed to the metal vapors which condense and form a uniform coating thereon. In a similar manner the radio grills, knobs and handles can be positioned in the metal coating apparatus.

The vacuum may be produced by a mechanical pump and a diffusion pump which are operated in the usual manner. A vacuum of ½ micron of mercury gives a satisfactory metal coating.

Protective coatings

The epoxide resin protective layer which is placed over the metal layer may be coated from the following solution:

| | Per cent |
|---|---|
| Epoxide-urea formaldehyde resin | 16.7 |
| Toluol | 41.5 |
| Cellosolve acetate | 24.6 |
| Acetone | 17.2 |

The preferred epoxide resin is that sold by Shell Chemical Co. as "Epon" 1001 resin. The "Epon" or epoxide resins represent a new class of condensation polymers and have the typical structure:

The urea-formaldehyde of the epoxide-urea formaldehyde resin serves as a curing agent and cross links with the reactive hydroxyl and epoxide groups which are widely spaced along the epoxide chain and make it thermosetting when heated as described herein. The polar-nature of the molecule provides excellent adhesion to the aluminum surface.

This transparent coating will not discolor or affect the brilliance of the aluminum reflecting surface. It will adhere satisfactorily to the aluminum surface without distorting its mirror-like qualities. It is of water-white transparency and has a high gloss which weathering does not turn yellow. It will withstand flexing without breaking or chipping and is tough and scuffproof. It dries quickly.

The scratch resistant overcoat layer 14 may be coated from a solution containing 0.1% silicone oil in naphtha.

In commercial production the various dipped coatings may be respectively applied by suspending the reflectors or other articles on conveyors which dip them in the respective solutions and then carry them through drying operations.

In the case of the photoflash reflectors they have a pleasing brightness and high reflectivity. This plastic reflector will give about 50% more illumination for flash photography than is obtained from the common satin-finish metal reflector.

The mirror-like finish is attractive to customers interested in photoflash equipment. The plastic reflector does not dent or bend as does aluminum and other all metal reflectors and if dropped will resist breaking. The protective coatings over the metal resist fingerprints and surface abrasion. The various layers which are attached to the plastic body will not peel off even though as in the case of the reflector which is somewhat flexible. In fact this plastic reflector is superior in reflectivity and appearance to the all metal product which it replaces.

The lamellar structure lends itself to large scale conveyor-type production. The materials and production techniques are readily reproducible.

While photoflash reflectors are advantageously made in accordance with my invention, it is emphasized that automobile hardware such as the handles described above may likewise be prepared with a metal-like coating over the cellulose acetate butyrate base. Such automobile appointments as grills, door handles, light fixtures and other decorative articles having bodies of acetate butyrate may be metal coated and overcoated in the manner described herein. By suitably masking portions of the plastic metal designs may be formed upon the plastic body thereby permitting the plastic to be presented in suitable color contrasts with the reflecting design.

I claim:
1. The method of forming a plastic having a metal coated light reflecting surface thereon which comprises molding a plasticized cellulose acetate butyrate molding composition into a plastic body of desired shape, sealing the total surface of the plastic body with an adherent layer consisting essentially of a urea-formaldehyde resin, vacuum coating an adherent aluminum metal reflecting layer over the entire surface of the urea-formaldehyde resin layer, covering the entire aluminum surface with a transparent adherent epoxide-urea formaldehyde layer, and finally coating this article with a transparent silicone resin layer.

2. The method of making a reflector which comprises molding a plasticized cellulose acetate butyrate molding composition into a plastic body of desired shape, coating the total surface of the plastic body with a layer consisting essentially of a urea-formaldehyde solution containing a polymerizing catalyst, baking this coating to cause it to form a form adherent impervious resin layer on the plastic body, vacuum coating an adherent aluminum metal reflecting layer over the entire surface of said resin, coating a solution of an epoxide-urea formaldehyde resin over the entire aluminum surface, baking this coating to cause it to form a form adherent protective resin layer over the aluminum surface, coating the epoxide-urea resin layer with a solution of silicone oil, and drying the coating to form an outer protective layer on the completed reflector.

3. A cellulose acetate butyrate plastic article having a light reflecting surface thereon comprising a cellulose acetate butyrate body, an impervious coating consisting essentially of a urea-formaldehyde resin thereover, an adherent aluminum coating over said resin coating, a transparent epoxide urea formaldehyde resin coating over said aluminum coating, and a transparent overcoating of silicone resin upon the epoxide-urea resin, said reflector having a high specular reflection.

4. The method of making a reflector which comprises molding a plasticized cellulose acetate butyrate molding composition into a plastic body of desired shape, coating the total surface of the plastic body with a solution containing 22.3% urea-formaldehyde, 2.3% butyl alcohol, 49.2% denatured alcohol, 26.0% naptha and 0.2% phosphoric acid, baking this coating to cause it to form a firm adherent impervious resin layer on the plastic body, vacuum coating an adherent aluminum metal reflecting layer over the entire surface of said resin, coating a solution of an epoxide-urea formaldehyde resin over the entire aluminum surface, baking this coating to cause it to form a form adherent protective resin layer over the aluminum surface, coating the epoxide-urea formaldehyde resin layer with a solution of silicone oil, and drying the coating to form an outer protective layer on the completed reflector.

References Cited in the file of this patent

FOREIGN PATENTS 492,984     Great Britain _____ Sept. 30, 1938